(12) United States Patent
Thomsen et al.

(10) Patent No.: US 8,535,053 B2
(45) Date of Patent: Sep. 17, 2013

(54) METHOD AND APPARATUS FOR INCINERATION OF COMBUSTIBLE WASTE

(75) Inventors: Kent Thomsen, Roskilde (DK); Lars Skaarup Jensen, Vallensbaek (DK); Alexander Helm, Alleröd (DK)

(73) Assignee: Flsmidth A/S, Valby (DK)

( * ) Notice: Subject to any disclaimer, the term of this patent is extended or adjusted under 35 U.S.C. 154(b) by 1941 days.

(21) Appl. No.: 11/578,197

(22) PCT Filed: May 10, 2005

(86) PCT No.: PCT/IB2005/001257
§ 371 (c)(1),
(2), (4) Date: Oct. 11, 2006

(87) PCT Pub. No.: WO2005/108892
PCT Pub. Date: Nov. 17, 2005

(65) Prior Publication Data
US 2007/0234940 A1     Oct. 11, 2007

(30) Foreign Application Priority Data

May 10, 2004   (DK) ................. 2004 00735

(51) Int. Cl.
*F27B 15/00* (2006.01)
(52) U.S. Cl.
USPC .............. 432/14; 432/106; 110/246; 110/346
(58) Field of Classification Search
USPC ................. 432/14, 103–106; 110/245, 246, 110/346
See application file for complete search history.

(56) References Cited

U.S. PATENT DOCUMENTS

| 4,295,823 | A |   | 10/1981 | Ogawa et al. |
| 4,627,877 | A | * | 12/1986 | Ogawa et al. ............ 432/14 |
| 4,640,681 | A |   | 2/1987  | Steinbiss et al. |
| 6,210,154 | B1|   | 4/2001  | Evans et al. |
| 6,626,662 | B2|   | 9/2003  | Ramesohl et al. |

FOREIGN PATENT DOCUMENTS

| EP | 1 200 778 D1 | 2/2002 |
| JP | 57 007230 A | 1/1982 |
| JP | 2003506299 | 2/2003 |
| WO | WO 0109548 A1 | 2/2001 |

OTHER PUBLICATIONS

Russian Office Action dated Feb. 4, 2009 issued in corresponding application.
Chinese Office Action issued in corresponding application.
Japanese Office Action (English and Japanese translations) issued Dec. 3, 2010 for the corresponding Japanese application.

* cited by examiner

*Primary Examiner* — Jiping Lu
(74) *Attorney, Agent, or Firm* — Jeffrey S. Melcher; Manelli Selter PLLC

(57) ABSTRACT

Described is a method as well as an apparatus for incineration of combustible waste during the manufacture of cement clinker by which method the waste is introduced via a waste inlet (11) and supported on a supporting surface (21) incorporated in a separate compartment (9), where the waste being actively transported, while simultaneously subjected to incineration, through the compartment to its outlet (23), where the hot exhaust gases produced in connection with the incineration of the waste being vented to the preheater system for heating the cement raw meal, and where the slag generated during the waste incineration process being extracted from the compartment (9). The method and the apparatus are peculiar in that exhaust gases containing NOx are introduced to the compartment (9).

4 Claims, 5 Drawing Sheets

METHOD AND APPARATUS FOR INCINERATION OF COMBUSTIBLE WASTE

FIELD OF THE INVENTIONS

The present invention relates to a method for incineration of combustible waste during the manufacture of cement clinker where cement raw meal is preheated in a preheater system with or without a calciner, burned into clinker in a kiln and cooled in a subsequent clinker cooler, by which method the waste is introduced via a waste inlet and supported on a supporting surface incorporated in a separate compartment, where the waste being actively transported, while simultaneously subjected to incineration, through the compartment to its outlet, where the hot exhaust gases produced in connection with the incineration of the waste being vented to the preheater system for heating the cement raw meal, and where the slag generated during the waste incineration process being extracted from the compartment.

The invention also relates to an apparatus for carrying out the method.

BACKGROUND OF THE INVENTIONS

Examples of combustible waste include tyres, furniture, carpets, wood refuse, garden waste, kitchen waste, paper sludge, biomass, petcoke, sewage sludge and bleaching earth.

From EP-1200778, the contents of which is hereby invoked as being part of the present application, is known a method as well as an apparatus of the aforementioned kind according to which the waste is burned in the separate compartment subject to simultaneous supply of hot air coming preferably from the clinker cooler. The exhaust gases formed during incineration are directed from the compartment into the preheater where they are utilized for heating the cement raw meal. In practice, this method and apparatus have proven to be particularly suitable for the incineration of waste, providing a significant heat contribution which has improved the total operating economics of the plant. However, it has also been ascertained that the $NO_x$ emission from this known apparatus may be at a high level given that in the compartment there is no reduction of the $NO_x$ which is formed in the kiln during the burning of cement clinker. In addition, the amount of fuel, which is introduced into a possible $NO_x$ reducing zone in the calciner, and being available for the reduction of the $NO_x$ vented from the kiln, is reduced, hence this kiln $NO_x$ in doing so is reduced less effectively.

SUMMARY OF THE INVENTIONS

It is the object of the present invention to provide a method as well as an apparatus for incineration of waste during the manufacture of cement clinker by means of which the total amount of $NO_x$ emission from the apparatus is significantly reduced.

This is obtained according to a first aspect of the present invention by means of a method of the kind mentioned in the introduction, being characterized in that exhaust gases containing $NO_x$ are introduced to the compartment.

According to a second aspect of the invention, an apparatus is provided for incineration of combustible waste comprising a raw meal store, a preheater system with or without calciner, a kiln, a clinker cooler, a compartment for incineration of the waste, said compartment comprising an inlet for introducing the waste into the compartment and an outlet for diverting slag and any unburned waste, which compartment comprises also a supporting surface for supporting the waste during the incineration process and means for transporting the waste from the waste inlet of the compartment to the outlet, being characterized in that it comprises means for introducing exhaust gases containing $NO_x$ into the compartment (9).

Hereby is obtained an apparatus which does not just offer simplicity in terms of design characteristics, but providing also the opportunity for reducing substantially the $NO_x$ emission. This is due to the fact that exhaust gases containing $NO_x$ are brought into contact with fuel, which reduces a part of the $NO_x$ content in the exhaust gases by various $NO_x$ reducing reactions which occur during this process, as explained in further details in the following. The incineration of the waste in the compartment can be viewed as comprising five stages which consist of a heating stage, a pyrolysis stage, an ignition stage, a reaction stage between components in gas phase and a reaction stage of char and soot. The gaseous reactants, the char and the soot are formed in connection with the pyrolysis of the waste during the heating process. The three pyrolysis products contain the nitrogen which is introduced to the compartment with the waste and any possibly admitted fuel. In the gases nitrogen is present as $N_2$, HCN, $NH_3$ and NO. The remaining part of the nitrogen is still bound in the soot and the char. In addition to the nitrogen-containing compounds, the gases will also contain $SO_2$, $H_2$, CO, $CH_4$ and hydrocarbons ($C_xH_y$) or radicals hereof. The pyrolysis of the waste begins immediately after the waste has been introduced to the compartment. The $NO_x$ reduction in the compartment is achieved by reactions between hydrocarbon radicals ($CH_i$.) and NO, which form HCN:

$$CH_i \cdot + NO \rightarrow HCN, i=1,2,3 \qquad (1)$$

or through reactions between CO or $H_2$ and NO, which are catalyzed by raw meal or char:

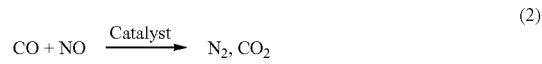

$$CO + NO \xrightarrow{\text{Catalyst}} N_2, CO_2 \qquad (2)$$

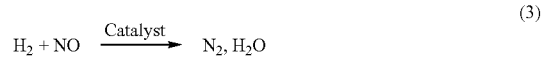

$$H_2 + NO \xrightarrow{\text{Catalyst}} N_2, H_2O \qquad (3)$$

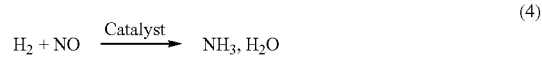

$$H_2 + NO \xrightarrow{\text{Catalyst}} NH_3, H_2O \qquad (4)$$

The reaction (1) is promoted by a high temperature and requires a small amount of oxygen to sustain the formation of $CH_i$. The reactions (2), (3) and (4) are catalyzed as previously mentioned by raw meal and are, furthermore, rendered impossible if oxygen is present. During the pyrolysis and the decomposition of NO, the compounds HCN and $NH_3$ are formed. Catalyzed by raw meal, HCN or $NH_3$ will be decomposed according to reaction (5) and (6), or will react by reactions (5a) or (6a) either with radicals (here exemplified by $O_2$/OH.) and NO, which, respectively, removes or forms $NO_x$.

$$HCN \xrightarrow{\text{catalyst}} N_2, CO, CO_2, H_2O \qquad (5)$$

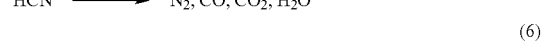

$$NH_3 \xrightarrow{\text{catalyst}} N_2, H_2 \qquad (6)$$

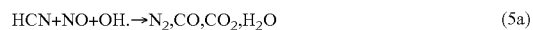

$$HCN + NO + OH. \rightarrow N_2, CO, CO_2, H_2O \qquad (5a)$$

$$NH_3 + NO + OH. \rightarrow N_2, H_2O \qquad (6a)$$

$$NH_3 + O_2 \rightarrow NO, N_2, H_2O \qquad (7)$$

$$HCN + O_2 \rightarrow NO, N_2, CO, CO_2, H_2O \qquad (8)$$

The reactions (7) and (8) will continue at the bottom of the subsequent preheater system, thus forming a certain amount of $NO_x$. The combustion of char and nitrogen in the char starts in the reducing atmosphere of the compartment and will mainly take place in the calciner or riser pipe of the subsequent preheater. Only a portion of the nitrogen in the char forms $NO_x$ during combustion, the remaining part will form $N_2$. Furthermore, the carbon in the char is capable of reacting with NO, forming $N_2$ and CO.

$$\text{Char-N} + O_2 \rightarrow NO \tag{9}$$

$$\text{Char-N} + O_2 \rightarrow N_2, O_2 \tag{10}$$

$$\text{Char-C} + NO \rightarrow N_2, CO \tag{11}$$

The $NO_x$ reducing reactions are promoted by a high temperature.

Further, it is preferred that at least a part of the incineration of the waste in the compartment takes place in a sub-stoichiometric atmosphere. This will further enhance many of the $NO_x$ removing reactions referred to above.

The $NO_x$ containing exhaust gases which are introduced to the compartment may in principle be sourced from any combustion unit, but according to the invention it is preferred that the exhaust gases are extracted from the kiln and introduced to the compartment via a riser duct. It is further preferred that all exhaust gases from the kiln are introduced to the compartment. If the exhaust gases from the kiln are led into the compartment prior to any input of air to the process, the only oxygen available in the compartment will thus be the oxygen contained in the exhaust gases sourced from the kiln, typically between 2 and 4% oxygen. This oxygen will rapidly be consumed during the incineration process, hence forming a $NO_x$ reducing zone where the $NO_x$ reduction according to reaction (2) to (4) is significantly enhanced so that essentially all of the $NO_x$ contained in the exhaust gases from the kiln will be removed while, simultaneously, the exhaust gases leaving the compartment will contain only a negligible amount of $NO_x$.

In order to achieve a satisfactory level of $NO_x$ reduction it is essential to ensure that the waste in the compartment has a sufficient retention time in contact with the exhaust gases in order to form a reducing zone. Therefore, it is preferred that the waste in the compartment is supported in a manner preventing the waste itself from having the ability to travel through the compartment, which can simply be achieved by ensuring that the supporting surface in the compartment is substantially horizontal across at least a portion of its total area. According to the invention, the waste must therefore be actively transported through the compartment and, in principle, this can be done in any appropriate manner. For example, the waste can be transported along a substantially linear path through the compartment by means of a pushing mechanism which is moved back and forth. However, it is preferred that the waste is transported through the compartment along a circular path, preferably on a rotary disc. This will allow the retention time of the waste in the compartment to be controlled simply by adjusting the rotational speed of the disc.

Also, it has proved advantageous to direct the exhaust gases into and through the compartment in counterflow to the waste stream. One of the effects of this will be that unburned char, on its discharge from the compartment, will be captured and entrained by the exhaust gases from the kiln, causing the char to burn when reacting with the oxygen in the exhaust gases. Hence the last burnable residues will be effectively burned, and, furthermore, the $NO_x$ reduction in the compartment will be improved by, with all other things being equal, extending the $NO_x$ reducing zone in the compartment.

A high temperature which can improve the efficiency of reaction (1) can be generated by using preferably variable means for splitting the raw meal into sub-streams which are directed to the riser duct, the compartment and the calciner, respectively. The temperature in the compartment is preferably adjusted within an interval between 925-1050° C. or the highest possible range without entailing risk of coating formations. According to the invention it is preferred that cement raw meal is introduced to the riser duct via an inlet.

For optimization of the capacity of the apparatus and the regulation of the temperature in the compartment for waste incineration, it is further preferred that cement raw meal is introduced to the compartment via an inlet for cement raw meal. The introduced raw meal will act as a heat reservoir, assisting in maintaining the temperature at the desired level, even when process conditions fluctuate. The compartment may comprise an inlet for introducing raw meal from the preheater, the calciner and/or the raw meal store. Further, the cement raw meal can capture volatile component in the gas stream, which might otherwise entail formation of cakings.

Typically, between 10 and 50% of the raw meal must be introduced to the kiln riser duct and/or the compartment.

It is of crucial importance for the NOx reduction to have a zone with intensely reducing conditions in order to promote the $NO_x$ reducing reactions. According to the invention, retention time in such reducing zone is provided by introducing and burning the waste in a sub-stoichiometric atmosphere. The result of the reactions will be a removal of between 50-90% of the $NO_x$ contained in the kiln exhaust gases.

In special cases it may be advantageous to introduce hot air from the clinker cooler to the compartment.

It is preferred that the exhaust gases generated during the waste incineration process are fed to the calciner of the preheater for calcination of the cement raw meal. This will cause combustible, volatile constituents and any undesirable combustion products, CO, soot etc. contained in the exhaust gases from the compartment to burn out and to be decomposed, respectively, in the calciner.

It is further preferred that the slag produced during the waste incineration process as well as any unburned waste are discharged from the compartment at its outlet and via the riser duct into the kiln. As a result, a portion of any unburned waste will, as previously noted, be captured and entrained by the exhaust gases admitted from the kiln and will burn out when reacting with the oxygen present in the exhaust gases.

In event of risks of overheating and/or explosion, it will not be possible to interrupt the incineration process in the compartment instantaneously in the manner practised in a traditional burner, and it is therefore preferred that cold raw meal from a raw meal store or a specifically provided emergency bin can be conducted to the compartment in such instances. It is further preferred that the cold raw meal is introduced to the compartment in sufficient quantity to cool down the waste and to shield it against the hot gasstream.

The apparatus comprises preferably a riser duct for introducing the exhaust gases into the compartment, said riser duct is connected to the kiln.

It is further preferred that the supporting surface is substantially horizontal to prevent the waste from travelling unaided through the compartment.

In a preferred embodiment of the invention, the supporting surface comprises a rotary disc which simultaneously serves as a means for transporting the waste through the compartment.

In the preferred embodiment, the apparatus further comprises a scraper mechanism for diverting the slag generated during the waste incineration process as well as any unburned waste away from the compartment at its outlet and into the riser duct.

The rotary disc may constitute a part of or the whole of the bottom of the compartment.

The rotary disc may be mounted for rotation about a substantially vertical axis proceeding through its centre. The axis may be angled relative to the vertical level, preferably between 1 and 10 degrees. If the rotary disc is thus made to slope slightly towards the outlet of the compartment, it will improve the discharge of slag and waste residues from the compartment.

To prevent circulation of the exhaust gases in the compartment, the latter comprises a preferably gas-tight, stationary partition wall which is mounted on the rotation stretch between the outlet of the compartment and its inlet, and extending from the side wall of the compartment to the axis of rotation of the rotary disc.

The rotary disc preferably comprises a ceramic material.

In an alternative embodiment of the invention the supporting surface may be stationary and the means for transporting the waste through the compartment may comprise an element which rotates about an axis proceeding perpendicularly relative to the supporting surface. In this embodiment the transport means will preferably comprise a scoop wheel equipped with at least two scoops.

The invention will now be explained in further details with reference to the drawing, being diagrammatical, and where

DETAILED DESCRIPTION OF THE INVENTIONS

Figure 1:
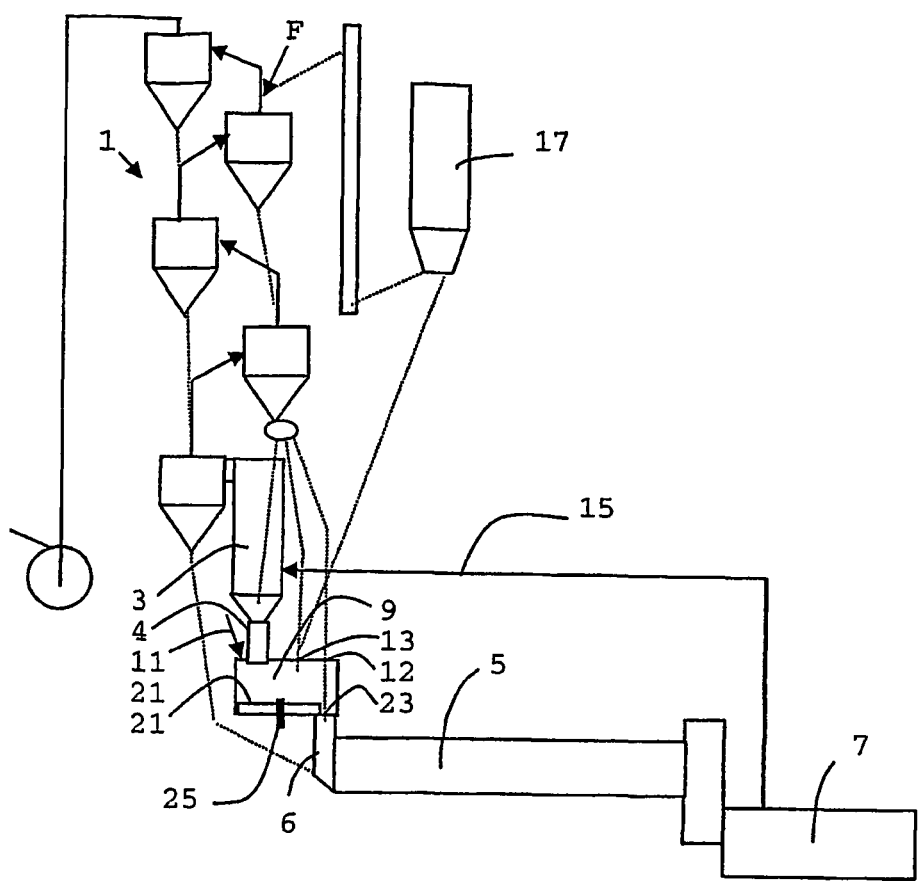
FIG. 1 shows an apparatus according to the invention.

In FIG. 1 is seen a plant for manufacturing cement clinker. The plant comprises a cyclone preheater 1 with calciner 3, a rotary kiln 5, a clinker cooler 7 and a compartment 9 for incineration of waste which is introduced via an opening 11 in the compartment 9. In the shown embodiment the compartment 9 is located between the calciner 3 and the rotary kiln 5. During operation the cement raw meal is directed from a raw meal store 17 to the raw meal inlet F of the preheater 1. From here the raw meal flows towards the rotary kiln 5 through the cyclones of the preheater 1 and the calciner 3 in counterflow to hot exhaust gases from the rotary kiln 5, thereby causing the raw meal to be heated and calcined. In the rotary kiln 5 the calcined raw meal is burned into cement clinker which is cooled in the subsequent clinker cooler 7 by means of atmospheric air. Some of the air thus heated is directed from the clinker cooler 7 via a duct 15 to the calciner 3.

Figure 2:
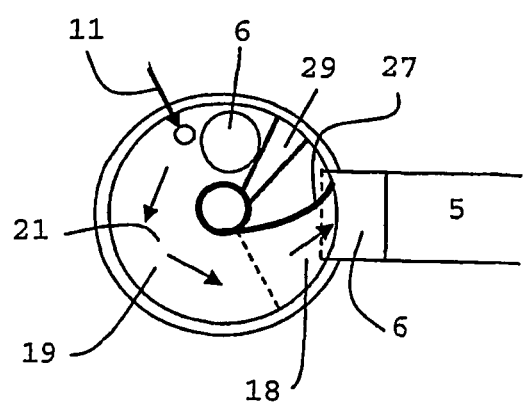
FIG. 2 shows a detail of a preferred embodiment of the invention, viewed from above.

Waste is introduced via the waste inlet 11 on a supporting surface 21 (see also FIG. 2) in compartment 9, and subsequently, when brought into contact with the hot exhaust gases being supplied via a riser duct 6 to the compartment 9 from the rotary kiln 5, the waste is heated, pyrolized and at least partially incinerated while it is simultaneously transported in the direction towards the outlet 23 of the compartment along a circular path. The exhaust gases from the kiln 5 will typically contain between 2 and 4% oxygen which in a so-called burning zone 18 comprising the riser duct 6 and the outlet end of the compartment 9 will react primarily with char and other combustible, solid constituents. In the remaining part of the compartment 9, which is a so-called pyrolysis zone 19, the temperature of the exhaust gases will be sufficiently high to cause pyrolysis of the waste, releasing the waste's content of volatile combustible constituents, which are entrained in the exhaust gas stream and vented via a riser duct 4 to the calciner 3 where they burn out. In this latter pyrolysis or $NO_x$ reducing zone 19 of the compartment 9, sub-stoichiometric $NO_x$ reducing conditions will thus prevail, resulting in effective removal of $NO_x$ by the reactions (1) to (4).

The temperature in the riser duct 6 and the compartment 9 can be controlled by introducing cement raw meal from the preheater, the calciner and/or the raw meal store to, respectively, the riser duct 6 and the compartment 9 per se via inlet 12 and 13, respectively. The raw meal which is introduced to the riser duct 6 will effectively reduce the exhaust gas temperature and capture volatile components in the exhaust gases, thus preventing formation of cakings in this area. Furthermore, this raw meal will act as a catalyst for the $NO_x$ reduction in this area.

In the shown embodiment, the supporting surface consists of a rotary disc 21 which rotates about an axis 25 and which constitutes the bottom of the compartment 9. For diversion of the combustion residues in the form of slag and any unburned waste through the outlet 23 of the compartment and into the riser duct 6, the compartment 9 comprises a scraper mechanism 27.

In this embodiment, the waste is transported from the inlet 11 supported by the rotary disc 21 in a circular path, as indicated at the arrows, through to the outlet 23 of the compartment 9 where the scraper mechanism 27 will ensure that all material on the rotary disc is pushed over the edge and into the riser duct 6, where the material is sorted so that small particles suspended in the exhaust gases are thrust upwards and back into the compartment 9, whereas any large particles are directed downwards to the kiln. The particles which are thrown back to the compartment 9 will thus burn out when reacting with the oxygen in the exhaust gases, thereby extending the $NO_x$ reducing zone in the compartment 9.

The compartment may also comprise a gas-tight, stationary partition wall 29 which is located on the rotational stretch between the outlet 23 of the compartment and inlet 11. The function of the partition wall is to ensure that the hot exhaust gases from the kiln 5 travel in counterflow over the waste along a path which is roughly the same. Hence, the exhaust gases formed during incineration in the compartment with their content of combustible constituents will be directed via the riser duct 4 into the calciner 3 in which its content of combustible constituents are burned out and thus utilized for calcination of the cement raw meal.

The retention time of the waste in the compartment can be simply controlled by regulating the rotational speed of the rotary disc. Furthermore, significant advantages may be obtained by operating at a higher speed during a short period of time, followed by a prolonged break, since this will result in better scraper performance than is attainable during constant low-speed operation. Another option involves intermittent high-speed operation in forward direction, separated by intermittent periods of backward operation over smaller distances. The different modes of operation make it possible to vary the retention time of the waste in order to ensure complete combustion of the waste material.

In event of risks of overheating and/or explosion in the compartment 9, cold raw meal from a raw meal store 17 or a specifically provided emergency bin can be conducted to the compartment 9. The cold raw meal will preferably be supplied in sufficient quantity to ensure cooling of the waste and to shield it from the hot gases from the kiln 5.

In FIG. 3 to 6 are seen four examples of alternative embodiments of the apparatus according to the invention.

Figure 3:
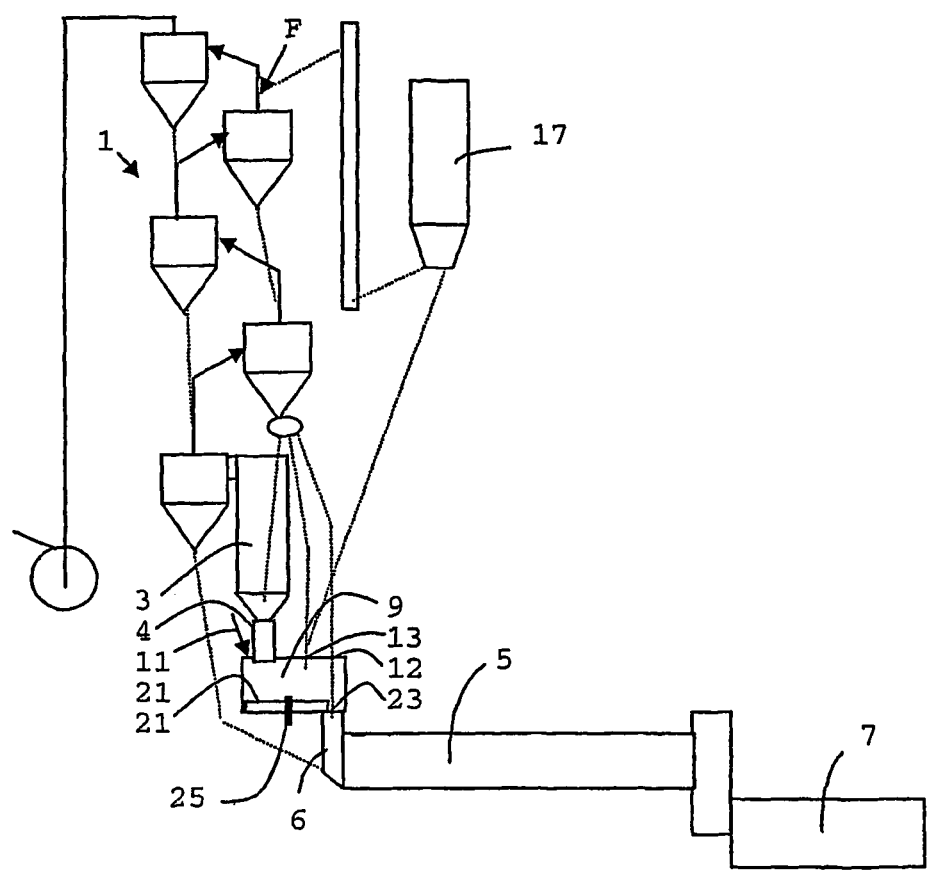
FIG. 3-6 show alternative embodiments of the apparatus according to the invention.

The embodiment shown in FIG. 3 does not comprise a duct 15, which means that all the heated air vented from the clinker cooler 7 is led through the kiln 5. Hence, the exhaust gases being discharged from the kiln 5 and being conducted to the compartment 9 will have a higher oxygen content, which entails a more rapid incineration of the waste in the compartment. In this embodiment reduction of $NO_x$ contained in the kiln gases will take place because waste and pyrolysis gases are brought into contact with the $NO_x$ containing kiln gases and reducing conditions locally will be present, however the total $NO_x$ reduction will be at a lower level than in the embodiment shown in FIG. 1.

Figure 4:
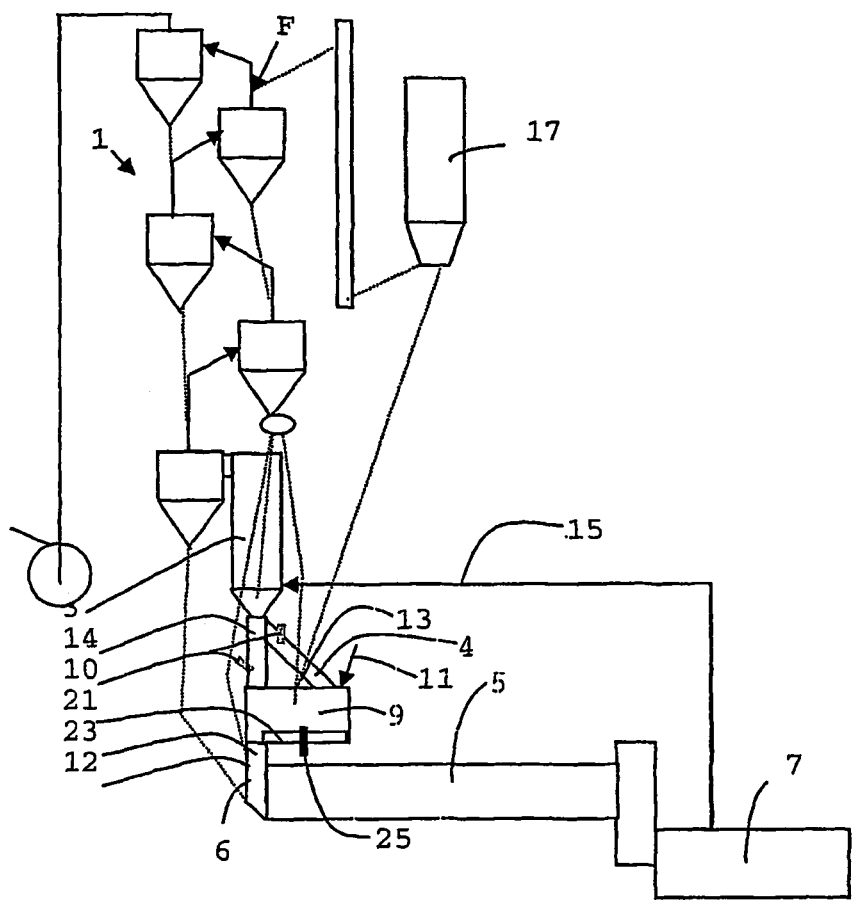

The embodiment shown in FIG. 4 comprises an extra duct 14, so that the exhaust gases from the kiln, particles and volatile potentially caking-forming components in a variable manner by means of regulation means 10 can be routed through or around, respectively, the compartment 9.

Figure 5:
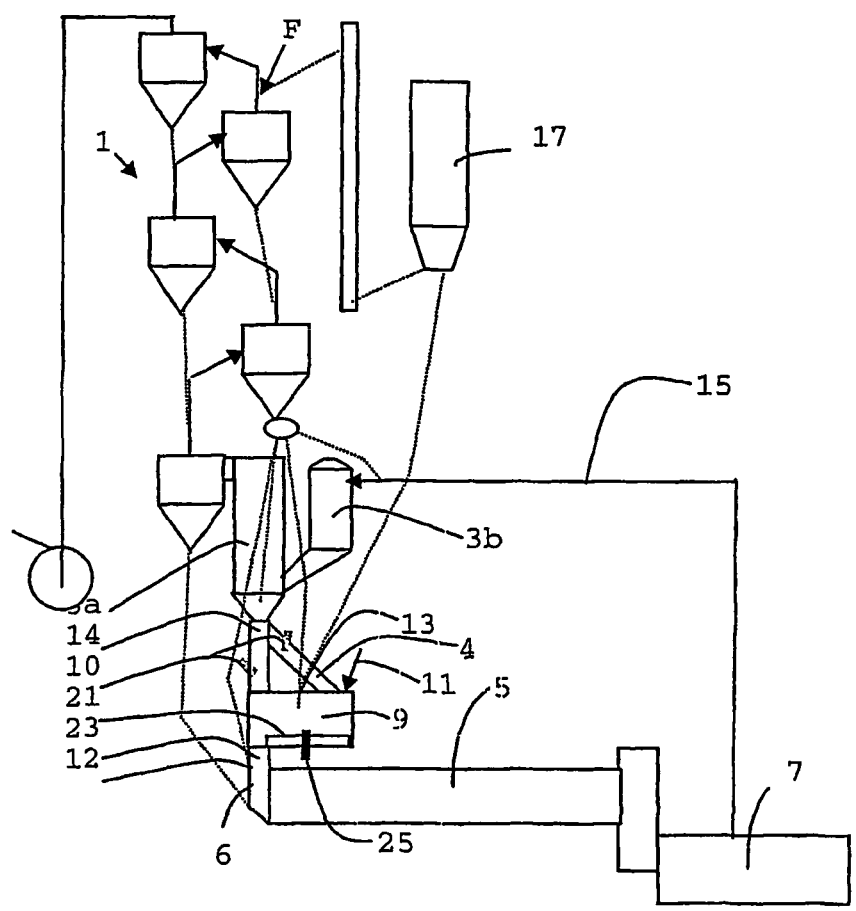

The embodiment shown in FIG. 5 corresponds to the one shown in FIG. 4, except from the fact that it comprises a calciner 3a, 3b of the "down draft" type.

Figure 6:
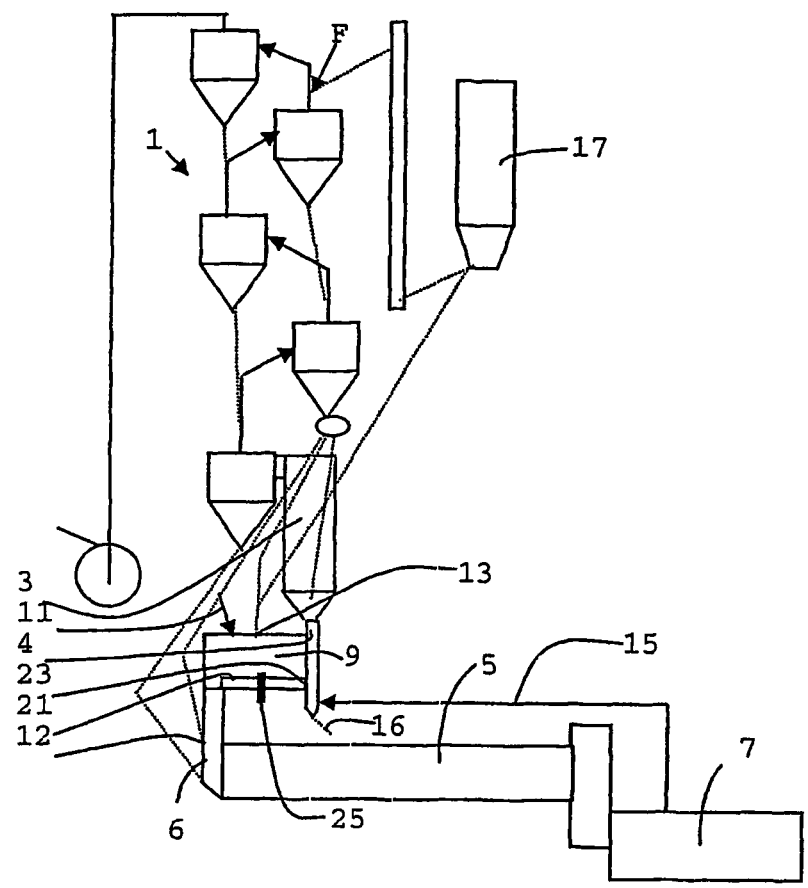

The embodiment shown in FIG. 6 corresponds essentially to the one shown in FIG. 1, except from the fact that it comprises an assembly 16 for extracting slag and unburned components, which in connection with the combustion of waste having a high content of iron or steel, such as car tyres, may be of high importance in order not to influence on the cement chemistry in an unintentional manner.

The invention claimed is:

1. A method for incineration of combustible waste during the manufacture of cement clinker comprising:
    preheating cement raw meal in a preheater system with or without a calciner;
    burning the preheated cement raw material to form clinker in a kiln;
    cooling the clinker in a subsequent clinker cooler;
    introducing waste to a waste inlet of a compartment in communication with the kiln and supporting the waste on a supporting surface incorporated in the compartment;
    actively transporting the waste while simultaneously subjecting the waste to incineration through the compartment to an outlet of the compartment, wherein at least a part of the incineration of the waste in the compartment takes place in a sub-stoichiometric atmosphere;
    venting hot exhaust gases produced in connection with the incineration of the waste to the preheater system for heating the cement raw meal;
    extracting slag generated during the waste incineration process from the compartment; and
    introducing exhaust gases from the kiln containing NOx into and through the compartment in counterflow to the waste stream, further comprising feeding the exhaust gases generated during the waste incineration process to the calciner of the preheater for calcination of the cement raw meal.

2. A method for incineration of combustible waste during the manufacture of cement clinker comprising:
    preheating cement raw meal in a preheater system with or without a calciner;
    burning the preheated cement raw material to form clinker in a kiln;
    cooling the clinker in a subsequent clinker cooler;
    introducing waste to a waste inlet of a compartment in communication with the kiln by a first riser duct;
    supporting and transporting the waste on a supporting surface of a rotary disk disposed in the compartment;
    transferring waste from the supporting surface into the first riser duct, wherein exhaust gases from the kiln traveling up the first riser duct and into the compartment catch small particles of waste material and the small particles of waste material travel with the hot exhaust gasses back into the compartment and larger particles fall down the first riser duct into the kiln;
    providing a partition wall in the compartment so that the hot exhaust gases from the kiln entering the compartment by the first riser duct are forced to travel in counterflow over the waste material on the supporting surface so that the hot exhaust gasses incinerate the waste material and simultaneously reduce the $NO_x$ concentration in the hot exhaust gasses, a retention time between the hot exhaust gasses and the waste material being adjustable by adjusting a speed of the rotary disc, and at least a part of the incineration of the waste in the compartment takes place in a sub-stoichiometric atmosphere; and
    venting hot exhaust gases produced in connection with the incineration of the waste from the compartment to the preheater system for heating the cement raw meal.

3. An apparatus for incineration of combustible waste during the manufacture of cement clinker comprising:
    a preheater system for preheating cement raw meal;
    a kiln in communication with the preheater system, the kiln being constructed and arranged for burning preheated cement raw material to form clinker;
    a compartment in communication with the kiln by a first riser duct;
    a rotary disc disposed in the compartment having a supporting surface for supporting and transporting the waste through the compartment;
    a scrapper constructed and arranged for transferring waste from the supporting surface into the first riser duct, wherein during operation exhaust gases from the kiln traveling up the first riser duct and into the compartment catch small particles of waste material and the small particles of waste material travel with the hot exhaust gasses back into the compartment and larger particles fall down the first riser duct into the kiln;
    the compartment being constructed and arranged so that during operation the hot exhaust gases from the kiln entering the compartment by the first riser duct are forced to travel in counterflow over the waste material on the supporting surface so that the hot exhaust gasses incinerate the waste material and simultaneously reduce the $NO_x$ concentration in the hot exhaust gasses, a retention time between the hot exhaust gasses and the waste material being adjustable by adjusting a speed of the rotary disc; and
    a second riser duct connecting the compartment to the preheater system for venting hot exhaust gases produced in connection with the incineration of the waste from the compartment to the preheater system for heating the cement raw meal.

4. Apparatus according to claim 3, further comprising a partition wall disposed in the compartment constructed and arranged so that during operation the hot exhaust gases from the kiln entering the compartment by the first riser duct are forced to travel in counterflow over the waste material on the supporting surface.

* * * * *